United States Patent
Marchand et al.

(10) Patent No.: US 9,479,001 B2
(45) Date of Patent: Oct. 25, 2016

(54) TECHNIQUE FOR SUPPLYING POWER TO A LOAD VIA VOLTAGE CONTROL AND CURRENT CONTROL MODES OF OPERATION

(71) Applicant: NVIDIA CORPORATION, Santa Clara, CA (US)

(72) Inventors: Rene Marchand, Brantford (CA); Thomas Dean Skelton, San Jose, CA (US); Matthew Longnecker, San Mateo, CA (US); Brian Smith, Mountain View, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 418 days.

(21) Appl. No.: 14/011,635

(22) Filed: Aug. 27, 2013

(65) Prior Publication Data

US 2015/0061633 A1    Mar. 5, 2015

(51) Int. Cl.

| G05F 1/56 | (2006.01) |
|---|---|
| H02J 7/00 | (2006.01) |
| G06F 1/00 | (2006.01) |

(52) U.S. Cl.
CPC ............. *H02J 7/0063* (2013.01); *G06F 1/00* (2013.01); *G05F 1/56* (2013.01)

(58) Field of Classification Search
CPC .............. G05F 1/10; G05F 1/56; G06F 1/26; G06F 1/263; G06F 1/32
See application file for complete search history.

(56) References Cited

U.S. PATENT DOCUMENTS

| 6,975,087 B1* | 12/2005 | Crabill ................ G05B 11/42 318/590 |
|---|---|---|
| 7,093,140 B2* | 8/2006 | Hsu ...................... G06F 1/26 315/291 |
| 7,103,189 B2* | 9/2006 | Ford ..................... H03F 3/68 381/120 |
| 7,586,379 B2* | 9/2009 | Shimizu .............. H03L 7/099 331/117 FE |
| 2012/0030483 A1* | 2/2012 | Kung .................... G06F 1/26 713/300 |
| 2013/0132757 A1* | 5/2013 | Chen .................... G06F 1/26 713/330 |
| 2015/0012762 A1* | 1/2015 | Liao ................. G06F 1/3203 713/310 |

* cited by examiner

*Primary Examiner* — Matthew Nguyen
(74) *Attorney, Agent, or Firm* — Artegis Law Group, LLP

(57) ABSTRACT

A regulator draws power from a battery or power delivery system and supplies regulated power to a load according to alternating modes of operation. In a voltage control mode, the regulator supplies power with a nominal voltage level and a fluctuating current level that is allowed to float according to the current demands of the load. When the load demands an amount of current that could potentially cause damage, the regulator transitions to a current control mode. In the current control mode, the regulator supplies power with a fluctuating voltage level and a maximum current level. The regulator transitions between voltage control mode and current control mode in order to supply a maximum power level to the load without exceeding the maximum current level. The regulator is also configured to limit the power drawn from the battery by decreasing the maximum output current, potentially avoiding voltage droop.

20 Claims, 7 Drawing Sheets

TECHNIQUE FOR SUPPLYING POWER TO A LOAD VIA VOLTAGE CONTROL AND CURRENT CONTROL MODES OF OPERATION

BACKGROUND OF THE INVENTION

1. Field of the Invention

Embodiments of the present invention relate generally to computer system power supply and, more specifically, to a technique for supplying power to a load via voltage control and current control modes of operation.

2. Description of the Related Art

A conventional computing device, such as a desktop computer, laptop computer, cell phone, or tablet device, typically includes a processing unit and other processing hardware configured to support the execution of various applications. Conventional computing devices also typically include a voltage regulator configured to draw power from a battery and to then supply that power to the processing hardware at a particular voltage level.

The processing hardware may draw varying levels of current from the voltage regulator, at a particular voltage level, depending on the various tasks that the device is configured to perform. For example, if the device executes a video game application, then the processing hardware may require increased current to support additional rendering tasks. In response, the voltage regulator provides the additional current while regulating to the particular voltage level.

One problem with this approach is that voltage regulators must be sized to accommodate peak current levels (which may exceed 30% of nominal levels) that only occur very rarely. Such regulators consume area and increase cost, yet provide a benefit that is rarely realized. In mobile computing devices, a voltage regulator of appropriate size for these current levels is typically much too large to fit within the form factor of the device, so the mobile device is oftentimes simply prevented from performing any tasks that require the peak current levels. This approach essentially limits the processing hardware from operating at peak performance.

Accordingly, what is needed in the art is an improved technique for regulating power supplied to processing hardware in a computing device.

SUMMARY OF THE INVENTION

One embodiment of the present invention sets forth a computer-implemented method for regulating power supplied to a load, including supplying power to the load at a regulated voltage level and an unregulated current level, determining that the unregulated current level exceeds a first maximum current level, and supplying power to the load at an unregulated voltage level and a regulated current level, where the regulated current level is less than or equal to the first maximum current level.

One advantage of the disclosed technique is that the load is provided with the maximum power available from the battery without exceeding the maximum current that is safe to supply to the load.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
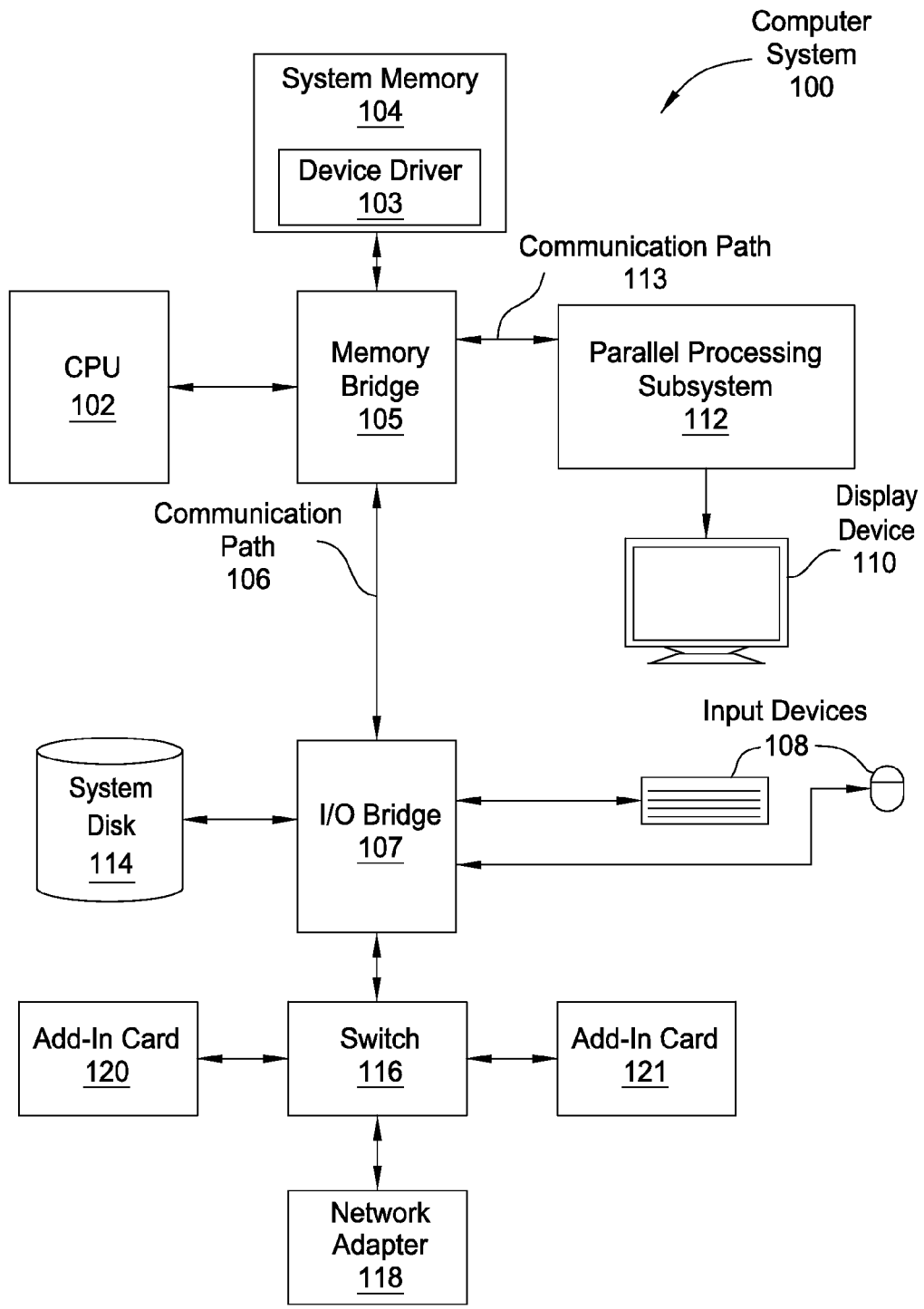
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
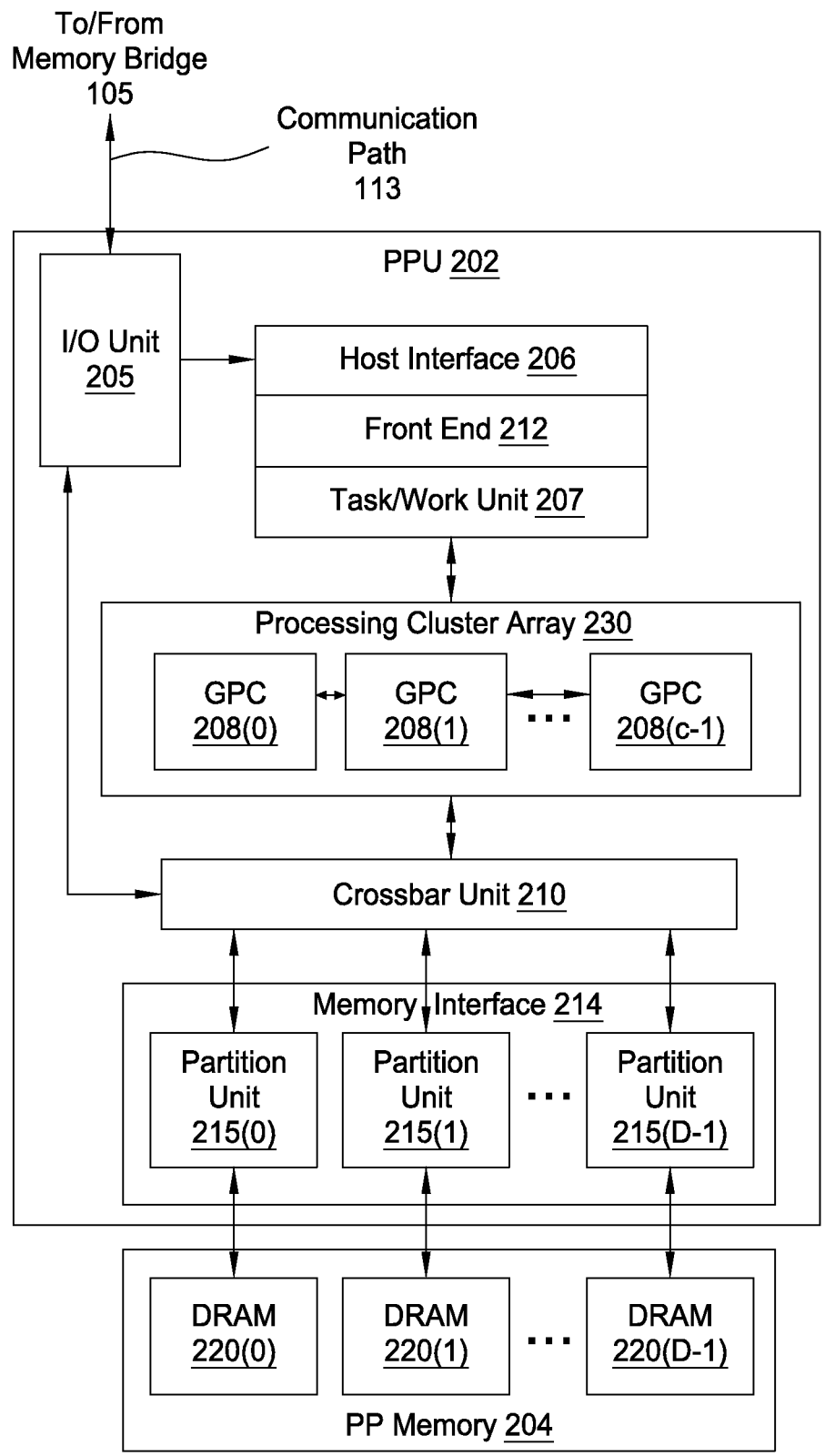
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Supplying Power to a Load Via Voltage Control and Current Control Modes of Operation In the context of this disclosure, computer system 100 shown in FIG. 1 is included within a battery-operated, mobile computing device, such as a cell phone or tablet computer. In addition, certain elements of computer system 100 are incorporated into an SoC, including CPU 102 of FIG. 1 and PPU 202 of FIG. 2, among other elements. The SoC supports the operation of the mobile computing device and is configured to draw power from a regulator that, in turn, draws power from a battery. However, persons skilled in the art will recognize that the approach described herein may be utilized within any system capable of drawing beyond a maximum current level that can be supplied by a regulator and/or power delivery and distribution network. Such power may be delivered by a super-capacitor, fuel cell, or a system connected to a power outlet, among others.

The regulator is configured to regulate power provided to the SoC by alternating between a voltage control mode and a current control mode. When operating in the voltage control mode, the regulator supplies a nominal voltage level to the SoC and allows the SoC to draw a variable level of current. When the SoC draws a significant amount of current, i.e. beyond a maximum allowable current level, then the regulator transitions to current control mode. In current control mode, the regulator supplies a fixed, maximum allowable current level and allows the voltage supplied to the SoC to fluctuate. With this technique, the regulator is capable of providing the SoC with the maximum amount of available power without providing an amount of current that would damage the SoC, regulator, battery, or system components.

The regulator is also configured to regulate the power that is drawn from the battery by limiting both the current and the voltage that is provided to the SoC. In doing so, the regulator implements the voltage control mode and the current control mode mentioned above with a specific, low, maximum allowable current level. The regulator may thus avoid voltage droop at the regulator input and avoid system failure due to insufficient voltage. The regulator discussed thus far is described in greater detail below in conjunction with FIG. 3.

Figure 3:
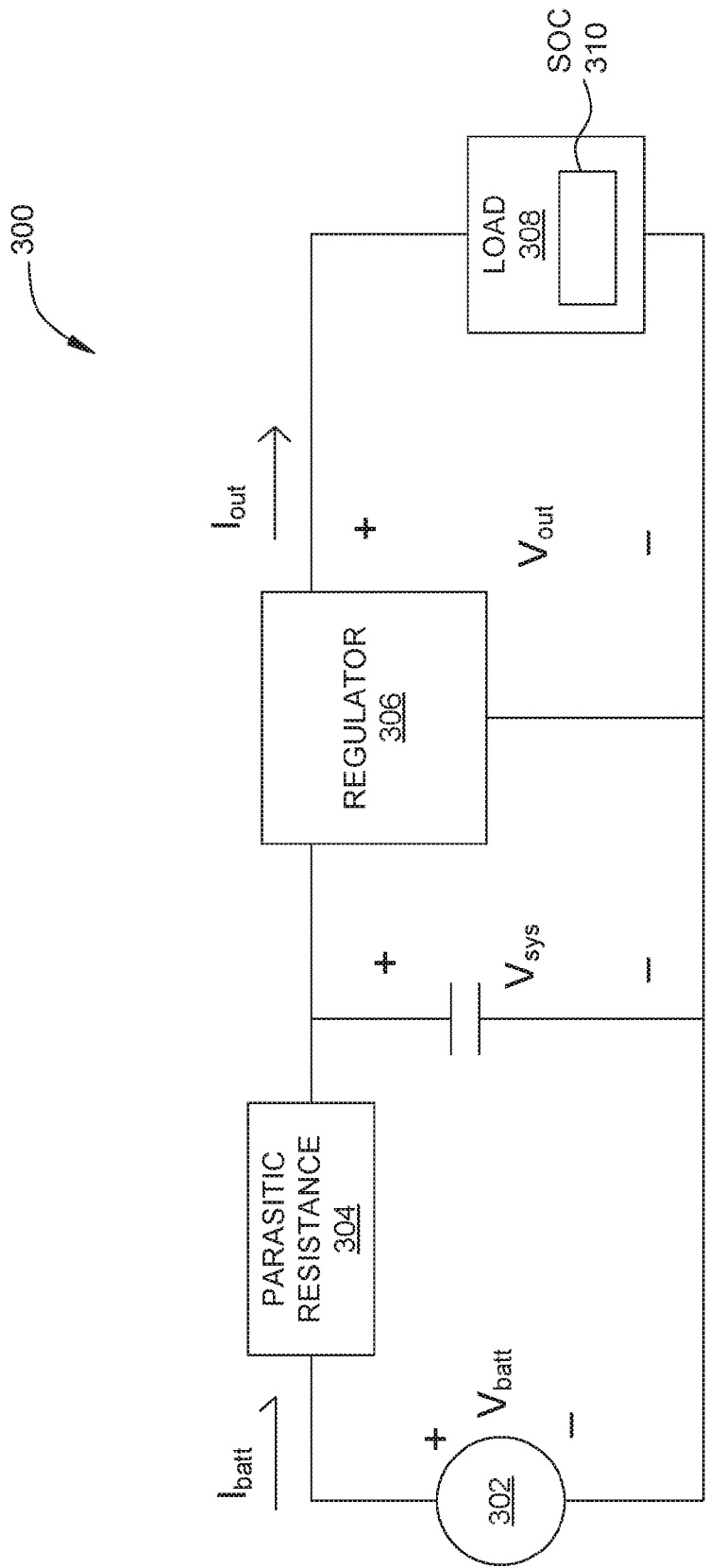
FIG. 3 illustrates a circuit configured to regulate power that is drawn from a battery and supplied to a load, according to one embodiment of the present invention.

FIG. 3 illustrates a circuit configured to regulate power that is drawn from a battery and supplied to a load, according to one embodiment of the present invention. Circuit 300 may represent a portion of computer system 100 shown in FIG. 1, and may also include certain portions of that computer system. In general, circuit 300 is included within a mobile computing device implemented by computer system 100.

As shown, circuit 300 includes battery 302 that is coupled to a regulator 306. Regulator 306, in turn, is coupled to load 308. Battery 302 may be any technically feasible type of electrochemical energy storage device, such as, e.g., a lithium-ion battery, among other types of batteries.

Between battery 302 and regulator 306, a parasitic resistance 304 is shown, which conceptually represents the accumulated resistance contributed by various different elements of circuit 300. Parasitic resistance 304 could include resistance caused by battery 302, resistance caused by various traces within a printed circuit board (PCB) included within circuit 300, or other such sources of resistance that may induce a voltage drop between battery 302 and regulator 306.

Regulator 306 is configured to draw power from battery 302 and to supply that power, in regulated fashion, to load 308. In particular, regulator 306 is configured to either (i) regulate voltage output without regulating current output in accordance with a voltage control mode, or (ii) regulate current output without regulating voltage output in accordance with a current control mode. Regulator 306 may also operate in either voltage control mode or current control mode in order to regulate the voltage drawn from battery 302. The functionality of regulator 306 is described generally herein, as well as in greater detail below in conjunction with FIGS. 4-7.

Regulator 306 includes a variety of different sense elements (none shown) configured to measure input and output voltage and current associated with regulator 306. The measurements performed by these sense elements provide inputs to a voltage control loop and to a current control loop (neither shown) also included within regulator 306. The voltage control loop and the current control loop are configured to implement the aforementioned voltage control mode and current control mode, respectively. As a general matter, any collection of sense elements and feedback control loops configured to perform the functionality of regulator 306 described herein falls within the scope of the present invention, and a particular arrangement of those elements is omitted for the sake of simplicity.

As mentioned, regulator 306 provides regulated power to load 308. Load 308 includes various elements of computer system 100 that are configured to draw the regulated power from regulator 306. As shown, load 308 includes an SoC 310 that is configured to support the operation of computer system. SoC 310 may include CPU 102 of FIG. 1 and/or PPU 202 shown in FIG. 2, as well as other elements shown in FIGS. 1-2.

SoC 310 is configured to draw power from regulator 306 that may have a varying voltage level. SoC 310 is capable of adjusting processing throughput in order to account for variations in that voltage level. For example, if the voltage level supplied by regulator 306 where to decrease, then SoC 310 could respond by lowering the frequency of a processing element, decrease the frame rate of a video being displayed, and so forth. As a general matter, SoC 310 may be any type of subsystem capable of adapting processing operations to account for varying levels of voltage in a power supply.

In practice, battery 302 supplies a current $I_{batt}$ to regulator 306 across parasitic resistances 304. The current supplied by battery 302 has voltage $V_{batt}$, although $V_{batt}$ drops to $V_{sys}$ across parasitic resistances 304. Regulator 306 receives input current $I_{batt}$ at input voltage $V_{sys}$ and supplies output current $I_{out}$ to load 308 at voltage $V_{out}$.

When operating in the voltage control mode discussed above, regulator 306 maintains a nominal output voltage $V_{out}$ while allowing load 308 to draw a variable output current $I_{out}$. However, under certain circumstances load 308 may draw an increased amount of current in order to perform an increased number of processing operations. For example, SoC 310 could execute a video game application that suddenly attempted to render a very complex graphical scene. In order to perform the rendering within a given timeframe, SoC 310 may draw an increased amount of current in order to support the execution of an increased number of instructions. In order to avoid damage to battery 302, regulator 306, and/or load 308, that could be caused by such a spike in current draw, regulator 306 is configured to transition from voltage control mode to current control mode when $I_{out}$ exceeds $I_{max}$.

When operating in current control mode, regulator 306 fixes the output current $I_{out}$ to the maximum allowable output current $I_{max}$, while allowing load 308 to draw a variable output voltage $V_{out}$. $V_{out}$ may, in response, droop, and so regulator 306 may continue to provide a relatively steady amount of power. SoC 310 within load 308 may respond to the decrease in supply voltage $V_{out}$ by adjusting processing operations accordingly, as mentioned above. Regulator 306 may change from current control mode back to voltage control mode when the current demands of load 308 subside, e.g., when processing operations return to nominal levels. The voltage control mode and current control mode are described in greater detail below in conjunction with FIGS. 4 and 6.

Regulator 306 may operate in voltage control mode and current control alternately and with different values of $I_{max}$ in order to regulate the voltage that is drawn from battery 302 across parasitic resistance 304, $V_{sys}$. In certain situations, $V_{sys}$ may fall below a minimum acceptable level, referred to herein as $V_{sysmin}$. For example, in situations where load 308 suddenly draws an increased amount of current, regulator 306 could respond by increasing $I_{batt}$ drawn from battery 302 which, in turn, could cause $V_{sys}$ to fall below $V_{sysmin}$. When $V_{sys}$ falls below $V_{sysmin}$, the system operation may fail or regulator 306 and load 308 may be at risk of damage due to insufficient supply voltage. To avoid such situations, regulator 306 is configured to monitor $V_{sys}$ and, when $V_{sys}$ falls below $V_{sysmin}$, to decrease $I_{max}$.

When $I_{max}$ is decreased, regulator 306 typically responds by entering current control mode, thereby causing $V_{out}$ to droop temporarily and, consequently, reducing the voltage needed by regulator 306. Reducing $V_{out}$ will consequently reduce $I_{max}$. Battery 302 may then recover from the drooping voltage level and subsequently provide voltage at above $V_{sysmin}$. However, regulator 306 may also remain in voltage control mode when $I_{max}$ is decreased, although such a case is atypical in practice. The technique discussed herein for regulating input voltage is also described in greater detail below in conjunction with FIGS. 5 and 7.

Figure 4:
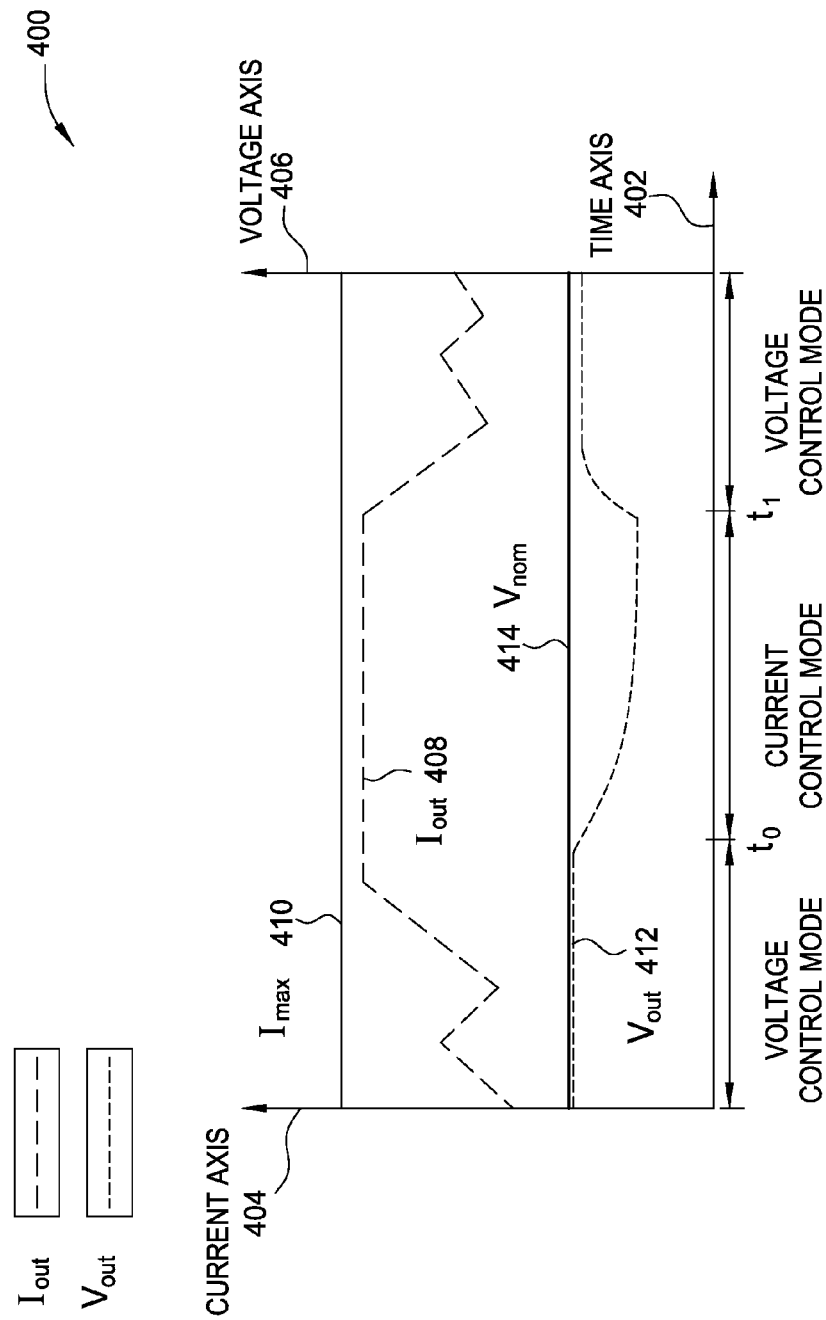
FIG. 4 is a graph that illustrates an exemplary output voltage and output current provided by a regulator included in the circuit of FIG. 3 during different modes of power regulation, according to one embodiment of the present invention.

FIG. 4 is a graph that illustrates an exemplary output voltage and output current provided by a regulator included in the circuit of FIG. 3 during different modes of power regulation, according to one embodiment of the present invention. Graph 400 is a superposition of different graphs that illustrate current and voltage levels associated with regulator 306 as different functions of time. Graph 400 is provided herein to illustrate the behavior of regulator 306 by way of example, and is not meant to limit the scope of the invention in any way. Further, graph 400 is not drawn to scale and should not be interpreted as such.

As shown, graph 400 includes a time axis 402, a current axis 404, and a voltage axis 406. Graph 400 also includes plotlines $I_{out}$ 408, $I_{max}$ 410, $V_{out}$ 412, and $V_{nom}$ 414. $I_{out}$ 410 represents the output current of regulator 306 as a function of time. $I_{max}$ 410 represents the maximum allowable value of $I_{out}$ 408. If regulator 306 were to supply an output current $I_{out}$ 408 beyond $I_{max}$ 410, battery 302, regulator 306 and/or load 308 could be damaged. $V_{out}$ 412 represents the output voltage of regulator 306 as a function of time. $V_{nom}$ 414 represents a nominal input voltage level for load 308. $V_{nom}$ 414 may be preconfigured in software, among other possibilities. Time axis 402 is demarcated with times t0 and t1.

Prior to time t0, regulator 306 operates according to voltage control mode. In voltage control mode, regulator 306 regulates $V_{out}$ 412 to $V_{nom}$ 414, while allowing $I_{out}$ 408 to fluctuate according to the current demands of load 308. However, at time t0, $I_{out}$ 408 reaches $I_{max}$ 410. In response, regulator 306 transitions from voltage control mode to current control mode.

In current control mode, regulator 306 regulates $I_{out}$ 408 to $I_{max}$ 410 while allowing $V_{out}$ 412 to droop temporarily beneath $V_{nom}$ 414. At time t1, regulator 306 determines that the current demands of load 308 have subsided, and load 308 therefore no longer requires the maximum current level $I_{max}$ 410. Regulator 306 then transitions back to voltage control mode at time t1.

Upon returning to voltage control mode, regulator 306 once again regulates $V_{out}$ 412 to $V_{nom}$ 414 and allows $I_{out}$ 408 to fluctuate according to the current demands of load 308. Regulator 306 may transition between voltage control mode and current control mode rapidly depending on the current requirements of load 308, thereby providing the maximum amount of available power to load 308, without drawing an excessive, and potentially damaging, amount of current.

Regulator 306 is configured to operate according to either voltage control mode or current control mode in order to regulate the input voltage ($V_{sys}$) that is drawn from battery 302 across parasitic resistances 304, as described above in conjunction with FIG. 3. In doing so, regulator 306 is configured to modify $I_{max}$ in order to limit the power that is drawn from battery 302, potentially reversing voltage droop at the input to regulator 306, as described in greater detail below in conjunction with FIG. 5.

Figure 5:
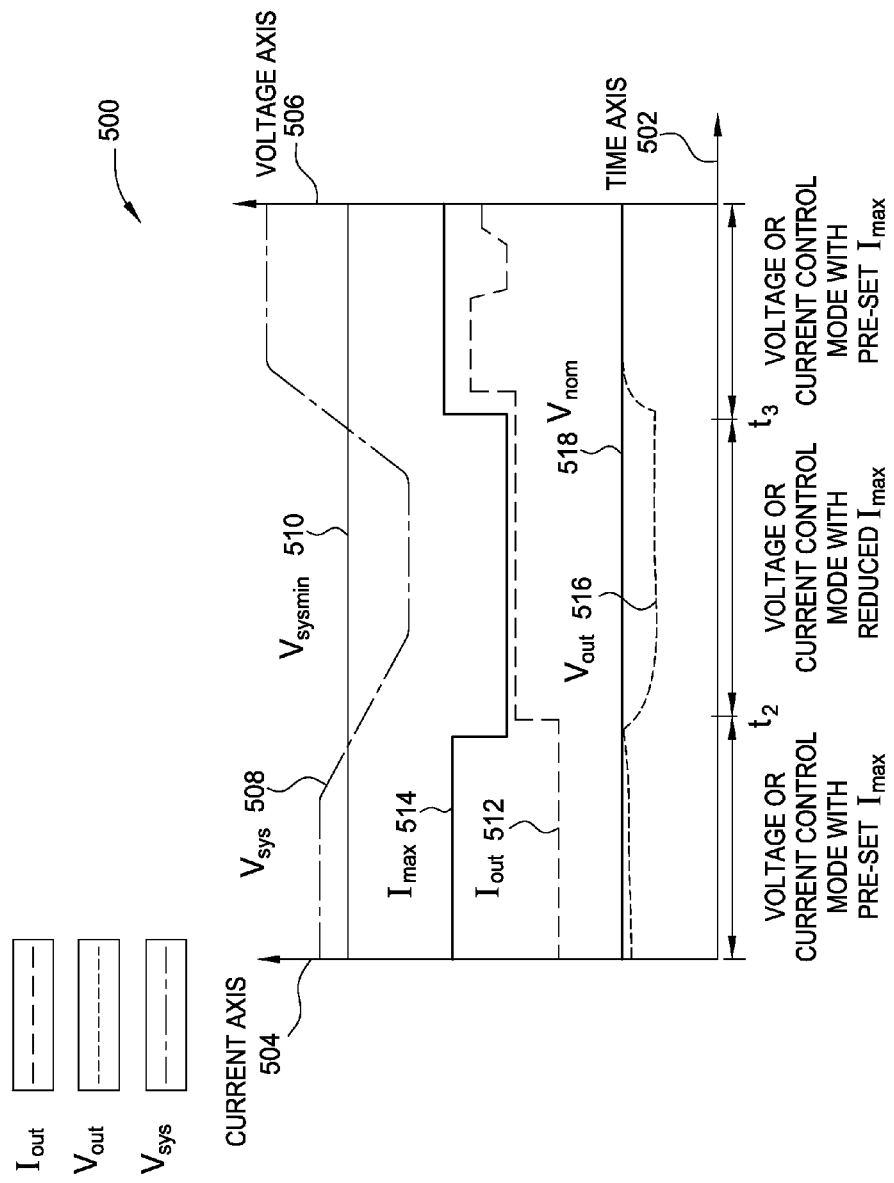
FIG. 5 is a graph of an exemplary input voltage drawn by the regulator of FIG. 3 during different modes of power regulation, according to one embodiment of the present invention.

FIG. 5 is a graph of an exemplary input voltage seen by the regulator of FIG. 3 during different modes of power regulation, according to one embodiment of the present invention. Graph 500 is a superposition of different graphs that illustrate current and voltage levels associated with regulator 306 as different functions of time. Graph 500 is provided herein to illustrate the behavior of regulator 306 by way of example, and is not meant to limit the scope of the invention in any way. Further, graph 500 is not drawn to scale and should not be interpreted as such.

As shown, graph 500 includes a time axis 502, a current axis 504, and a voltage axis 506. Graph 500 also includes plotlines $V_{sys}$ 508, $V_{sysmin}$ 510, $I_{out}$ 512, $I_{max}$ 514, $V_{out}$ 516, and $V_{nom}$ 518. $V_{sys}$ 508 represents the input voltage to regulator 306 as a function of time. $V_{sysmin}$ 510 represents the minimum allowable input voltage to regulator 306. If $V_{sys}$ 508 were to decrease beneath $V_{sysmin}$ 510 by a significant margin, then portions of circuit 300 could fail to operate entirely.

$I_{out}$ 512 represents the output current of regulator 306 as a function of time, while $I_{max}$ 514 represents the maximum allowable value of $I_{out}$ 512, as similarly shown in FIG. 4. $V_{out}$ 516 represents the output voltage of regulator 306 as a function of time, while $V_{nom}$ 518 represents a nominal input voltage level for load 308, also similarly shown in FIG. 4. Time axis 502 is demarcated with times t2 and t3.

Prior to time t2, battery 302 supplies current to regulator 306 with a voltage level $V_{sys}$ 508 that exceeds $V_{sysmin}$ 510. Again, $V_{sysmin}$ 510 represents the minimum system voltage needed to avoid potential malfunctions of circuit 300. Regulator 306 may operate according to either voltage control mode or current control mode prior to time t2.

At time t2, $V_{sys}$ 508 droops below $V_{sysmin}$ 510. $V_{sys}$ 508 could droop, for example, because load 508 attempted to draw an increased amount of current from regulator 306, i.e. in order to support an increase in processing operations. Regulator 306 would respond by drawing an increased current from battery 302, potentially causing the voltage supplied by battery 302 to droop. In response to the decrease in $V_{sys}$ 508, regulator 308 reduces the value of $I_{max}$ 514. Regulator 306 could reduce $I_{max}$ 514 by a specific fraction, or clamp $I_{max}$ 514 to a preset, lower value.

Under typical operating conditions, reducing $I_{max}$ 514 in the fashion described above causes regulator 306 to enter current control mode. In particular, the decreased value of $I_{max}$ 514 effected by regulator 306 may be quite lower than the nominal range of $I_{out}$ 512, and so regulator 306 may begin regulating $I_{out}$ 512 to the decreased value of $I_{max}$ 514. As is shown, after time t2, regulator 306 regulates $I_{out}$ 512 to the decreased value of $I_{out}$ 514.

In response, SoC 310 within load 308 may decrease processing throughput, thereby consuming less power and allowing $V_{out}$ 516 to droop temporarily. With a lower value of $V_{out}$ 516, the voltage needs of regulator 306 are relaxed, thereby allowing $V_{sys}$ 508 to recover to a level beyond $V_{sysmin}$ 514.

At time t3, regulator 306 determines that $V_{out}$ 508 has recovered to a level in excess of $V_{sysmin}$ 510, and then resets $I_{max}$ 514 to the previous, higher value. Under typical operating conditions, regulator 306 may then return to voltage control mode and regulate $V_{out}$ 516 to $V_{nom}$ 518, while allowing $I_{out}$ 512 to fluctuate according to the current demands of load 308.

Regulator 306 may thus regulate the input voltage $V_{sys}$ 508 by regulating either $I_{out}$ 512 or $V_{out}$ 516 (according to either current control mode or voltage control mode, respectively) as well as modifying $I_{max}$ 514. Regulator 306 may modify $I_{max}$ 514 by implementing a wide variety of techniques. For example, regulator 306 could decrease $I_{max}$ 514 in response to a drooping level of $V_{sys}$ 508, and then decrease $I_{max}$ 514 again in response to a further droop of $V_{sys}$ 508. Additionally, instead of returning $I_{max}$ 514 to a previous, high level when $V_{sys}$ 508 recovers beyond $V_{sysmin}$ 510, regulator 306 could increase $I_{max}$ 514 by a certain amount in order to slowly increase the voltage demand placed on battery 302.

The techniques described by way of example in conjunction with FIGS. 4 and 5 are also described in greater detail below in conjunction with FIGS. 6 and 7, respectively.

Figure 6:
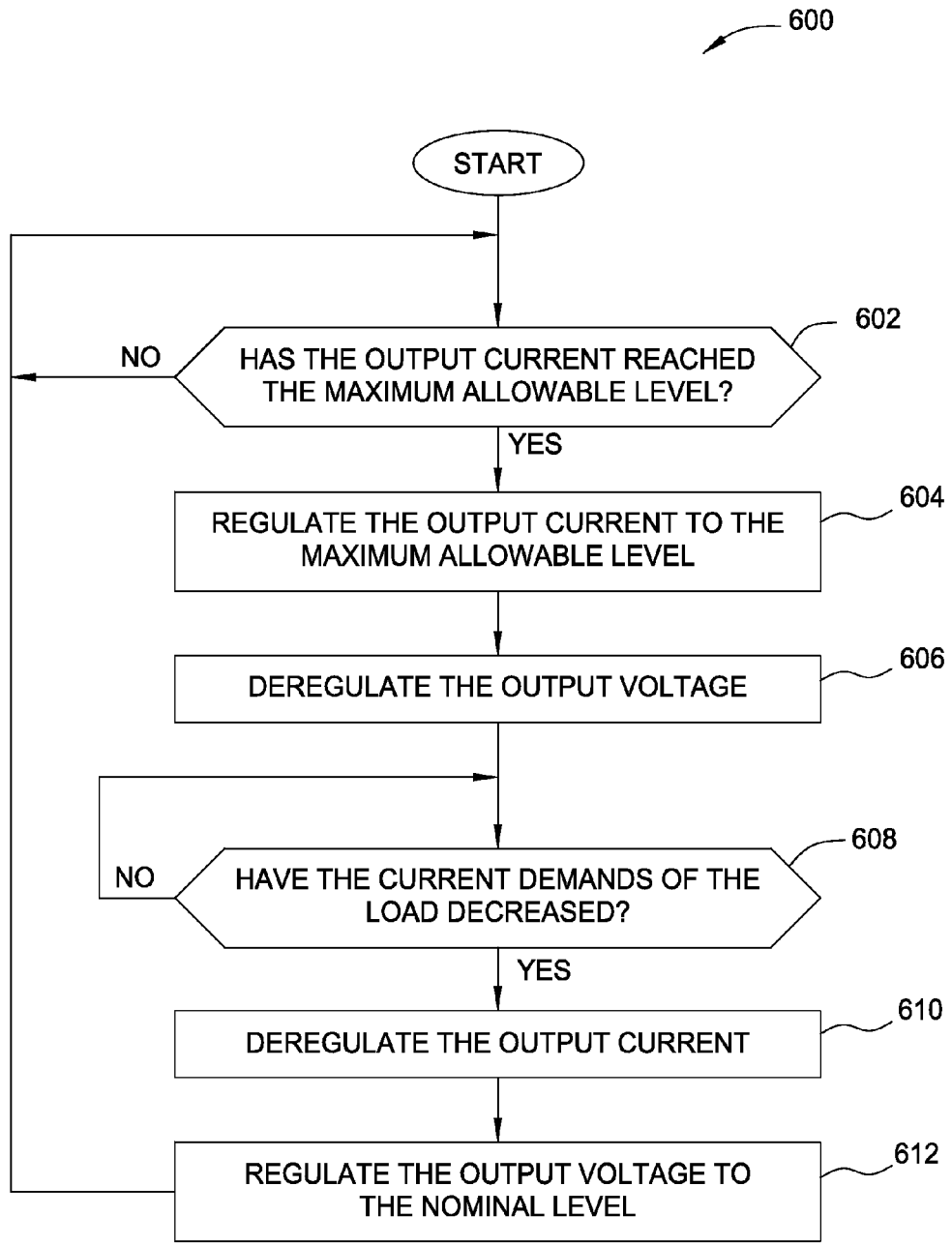
FIG. 6 is a flow diagram of method steps for regulating power output, according to one embodiment of the present invention.

FIG. 6 is a flow diagram of method steps for regulating power output, according to one embodiment of the present invention. Although the method steps are described in conjunction with the systems of FIGS. 1-5, persons skilled in the art will understand that any system configured to perform the method steps, in any order, is within the scope of the present invention.

As shown, a method 600 begins at step 602, where regulator 306 determines whether the output current $I_{out}$ has reached the maximum allowable level, $I_{max}$. Initially, regulator 306 starts in the voltage control mode. If regulator 306 determines that $I_{out}$ has not reached $I_{max}$, then regulator 306 remains in voltage control mode and repeats step 602. Otherwise, if regulator 306 determines that $I_{out}$ has reached $I_{max}$, then regulator 306 transitions to current control mode and proceeds to step 604.

At step 604, regulator 306 regulates the output current $I_{out}$ to $I_{max}$. At step 606, regulator 306 deregulates the output voltage $V_{out}$, thereby allowing $V_{out}$ to fluctuate. Regulator 306 generally operates according to current control mode by implementing steps 604 and 606 of the method 600. As described above in conjunction with FIG. 4, with $I_{out}$ regulated to $I_{max}$, according to step 604, $V_{out}$ may droop temporarily.

At step 608, regulator 306 determines whether the current demands of load 308 have decreased. If regulator 306 determines that the current demands of load 308 have not decreased, then regulator 306 remains in current control mode and repeats step 608. Otherwise, if regulator 306 determines that the current demands of load 308 have decreased, then regulator 306 transitions back to voltage control mode and proceeds to step 610.

At step 610, regulator 306 deregulates the $I_{out}$ and allows $I_{out}$ to fluctuate based on the current demands of load 308. At step 612, regulator regulates $V_{out}$ to the nominal voltage level ($V_{nom}$ in FIGS. 4 and 5). Regulator 306 generally operates according to voltage control mode by performing steps 610 and 612 of the method 600. The method 600 then returns to step 602 and regulator 306 proceeds as described above.

Regulator 306 may implement the method 600 repeatedly in order to transition between voltage control mode and current control mode on a continuous basis. In doing so, regulator 306 may supply the maximum amount of power available to load 308 without supplying a potentially damaging level of current. Regulator 306 is also configured to control the output voltage and output current in order to regulate the input voltage received from battery 302, as described in greater detail below in conjunction with FIG. 7.

Figure 7:
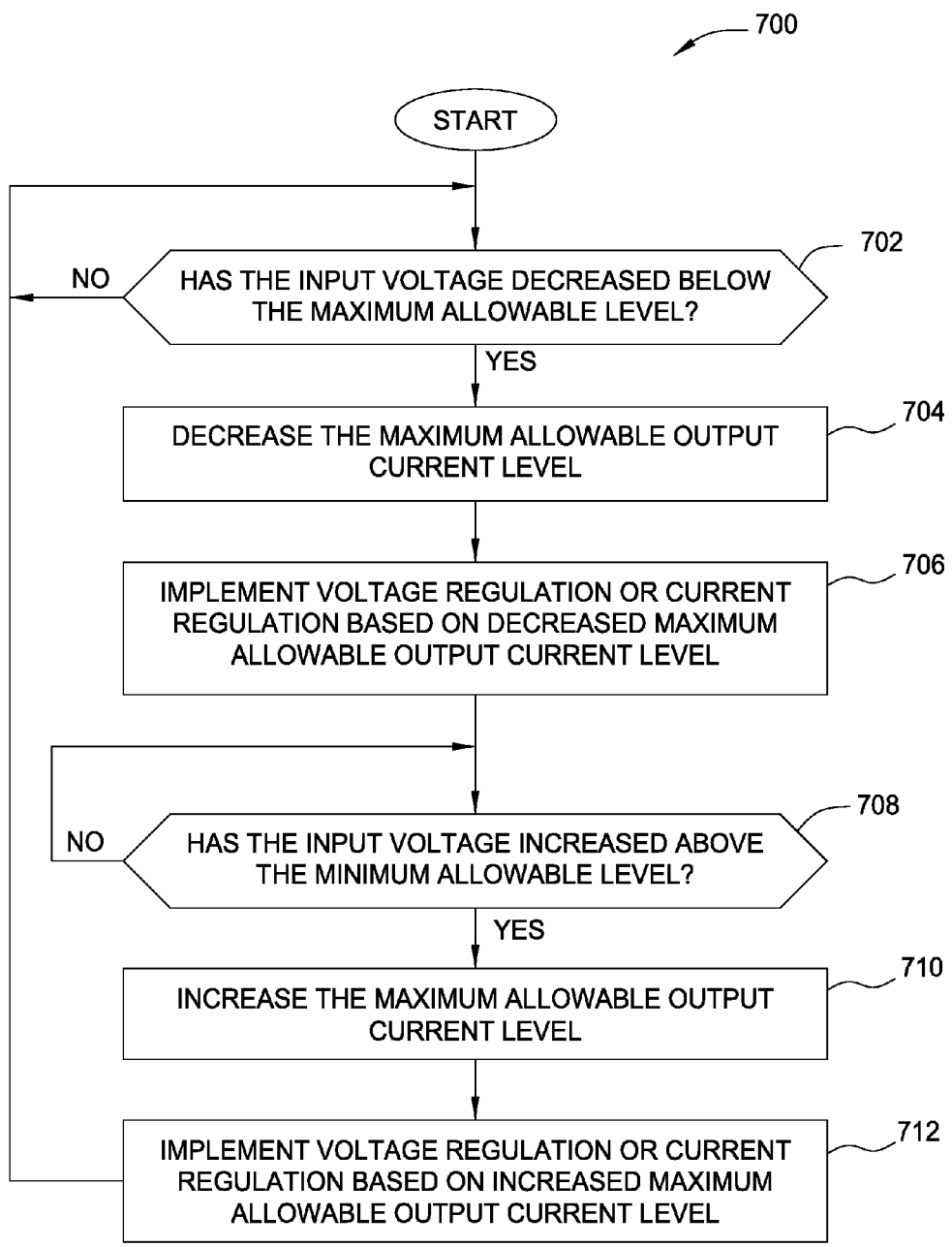
FIG. 7 is a flow diagram of method steps for increasing input voltage to prevent voltage droop, according to one embodiment of the present invention.

FIG. 7 is a flow diagram of method steps for increasing input voltage to prevent voltage droop, according to one embodiment of the present invention. Although the method steps are described in conjunction with the systems of FIGS. 1-5, persons skilled in the art will understand that any system configured to perform the method steps, in any order, is within the scope of the present invention.

As shown, a method 700 begins at step 702, where regulator 306 determines whether the input voltage $V_{sys}$ has decreased below the minimum allowable level, $V_{sysmin}$. Initially, regulator 306 may start in either the voltage control mode or the current control mode. If regulator 306 determines that $V_{sys}$ has not decreased below $V_{sysmin}$, then regulator 306 repeats step 702. Otherwise, if regulator 306 determines that $V_{sys}$ has decreased below $V_{sysmin}$, then the method proceeds to step 704.

At step 704, regulator 306 decreases the maximum allowable output current, $I_{max}$. In practice, when regulator 306 performs step 706, regulator 306 may also transition to current control mode, since the updated value of $I_{max}$ may fall below $I_{out}$, causing regulator 306 to transition between control modes in the fashion already described. In one embodiment, regulator 306 may decrease $I_{max}$ iteratively until a transition to current control mode occurs.

At step 706, regulator 306 operates according to voltage control mode or current control mode based on the decreased value of $I_{max}$. Typically, regulator 306 operates according to current control mode, and, thus, regulates $I_{out}$ to the decreased value of $I_{max}$ while allowing $V_{out}$ to fluctuate. $V_{out}$ may droop temporarily, thereby placing a lesser voltage demand on battery 302 and allowing $V_{sys}$ to recover.

At step 708, regulator 306 determines whether $V_{sys}$ has increased above $V_{sysmin}$. If regulator 306 determines that $V_{sys}$ has not yet increased above Vsysmin, then regulator 306 repeats step 708. Otherwise, if regulator 306 determines that $V_{sys}$ has increased beyond $V_{sysmin}$, then the method 700 proceeds to step 710. At step 710, regulator 306 increases $I_{max}$ to a previous level of $I_{max}$ (i.e., prior to decreasing $I_{max}$ at step 706). At step 712, regulator 306 operates according to voltage control mode or current control mode based on the value of $I_{max}$ increased at step 710. The method 700 then returns to step 702 and proceeds as described above.

By implementing the method 700 in conjunction with the method 600, regulator 306 may quickly alternate between voltage control mode and current control mode in order to limit the current drawn by load 308 and also limit voltage droop potentially caused by the current drawn by load 308.

In sum, a regulator draws power from a battery and supplies regulated power to a load according to alternating modes of operation. In a voltage control mode, the regulator supplies power with a nominal voltage level and a fluctuating current level that is allowed to float according to the current demands of the load. When the load demands an amount of current that could potentially damage the battery, regulator, or load, the regulator transitions to a current control mode. In the current control mode, the regulator supplies power with a fluctuating voltage level and a maximum current level. The regulator transitions between voltage control mode and current control mode in order to supply a maximum power level to the load without exceeding the maximum current level. The regulator is also configured to limit the voltage current or power drawn from the battery by decreasing the maximum output current, potentially avoiding voltage droop.

Advantageously, the load is provided with the maximum power available from the battery without exceeding the maximum current that is safe to supply to the load. Additionally, voltage droop at the regulator input may be prevented by limiting the power output of the regulator in response to decreasing input voltage. The regulator disclosed herein may thus enable processing elements within the load to operate at peak efficiency, without risk of total system failure.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for regulating power supplied to a load, the method comprising:
   supplying power to the load at a regulated voltage level and an unregulated current level; and
   subsequently, supplying power to the load at an unregulated voltage level and a regulated current level.

2. The computer-implemented method of claim 1, wherein the unregulated current level fluctuates in response to an amount of current demanded by the load.

3. The computer-implemented method of claim 1, further comprising:
   determining that the amount of current demanded by the load has decreased; and
   supplying power to the load at the regulated voltage level and the unregulated current level.

4. The computer-implemented method of claim 1, further comprising:
   determining that the unregulated current level exceeds a first maximum current level;
   determining a first voltage level associated with power supplied by a power delivery system;
   determining that the first voltage level is less than a minimum allowable voltage level;
   setting the first maximum current level to equal a second maximum current level; and
   supplying power to the load at the unregulated voltage level and a regulated current level, wherein the regulated current level is less than or equal to the second maximum current level.

5. The computer-implemented method of claim 4, further comprising:
   determining a second voltage level associated with power supplied by a power delivery system;
   determining that the second voltage level is less than the first voltage level;
   setting the first maximum current level to equal a third maximum current level; and
   supplying power to the load at the unregulated voltage level and a regulated current level, wherein the regulated current level is less than or equal to the third maximum current level.

6. The computer-implemented method of claim 5, further comprising:
   determining that the first voltage level is greater than the minimum allowable voltage level;
   setting the third maximum current level to equal the first maximum current level; and
   supplying power to the load at the unregulated voltage level and a regulated current level, wherein the regulated current level is less than or equal to the first maximum current level.

7. The computer implemented method of claim 6, wherein the first maximum current level is greater than the second maximum current level and the second maximum current level is greater than the third maximum current level.

8. The computer-implemented method of claim 1, wherein the load includes one or more processing units configured to adjust processing throughput in response to variable voltage levels associated with a power supply.

9. The computer-implemented method of claim 8, wherein the one or more processing units comprise a system-on-a-chip (SoC).

10. A subsystem configured to regulate power supplied to a load, comprising:
    a regulator configured to:
        supply power to the load at a regulated voltage level and an unregulated current level; and
        subsequently, supply power to the load at an unregulated voltage level and a regulated current level.

11. The subsystem of claim 10, wherein the unregulated current level fluctuates in response to an amount of current demanded by the load.

12. The subsystem of claim 10, wherein the regulator is further configured to:
    determine that the amount of current demanded by the load has decreased; and
    supply power to the load at the regulated voltage level and the unregulated current level.

13. The subsystem of claim 10, wherein the regulator is further configured to:
    determine that the unregulated current level exceeds a first maximum current level;
    determine a first voltage level associated with power supplied by a power delivery system;
    determine that the first voltage level is less than a minimum allowable voltage level;
    set the first maximum current level to equal a second maximum current level; and
    supply power to the load at the unregulated voltage level and a regulated current level, wherein the regulated current level is less than or equal to the second maximum current level.

14. The subsystem of claim 13, wherein the regulator is further configured to:
    determine a second voltage level associated with power supplied by a power delivery system;
    determine that the second voltage level is less than the first voltage level;
    set the first maximum current level to equal a third maximum current level; and
    supply power to the load at the unregulated voltage level and a regulated current level, wherein the regulated current level is less than or equal to the third maximum current level.

15. The subsystem of claim 14, wherein the regulator is further configured to:
    determine that the first voltage level is greater than the minimum allowable voltage level;
    set the third maximum current level to equal the first maximum current level; and
    supply power to the load at the unregulated voltage level and a regulated current level, wherein the regulated current level is less than or equal to the first maximum current level.

16. The subsystem of claim 15, wherein the first maximum current level is greater than the second maximum current level and the second maximum current level is greater than the third maximum current level.

17. The subsystem of claim 10, wherein the load includes one or more processing units configured to adjust processing throughput in response to variable voltage levels associated with a power supply.

18. The subsystem of claim 17, wherein the one or more processing units comprise a system-on-a-chip (SoC).

19. A computing device, comprising:
a load; and
a subsystem configured to regulate power supplied to the load, the subsystem including a regulator configured to:
supply power to the load at a regulated voltage level and an unregulated current level;
determine that the unregulated current level exceeds a first maximum current level; and
supply power to the load at an unregulated voltage level and a regulated current level, wherein the regulated current level is less than or equal to the first maximum current level.

20. The computing device of claim 19, wherein the regulator is further configured to:
determine a first voltage level associated with power supplied by a power delivery system;
determine that the first voltage level is less than a minimum allowable voltage level;
set the first maximum current level to equal a second maximum current level that is less than the first maximum current level; and
supply power to the load at the unregulated voltage level and a regulated current level, wherein the regulated current level is less than or equal to the second maximum current level.

* * * * *